US007111708B2

(12) United States Patent
Frey

(10) Patent No.: US 7,111,708 B2
(45) Date of Patent: Sep. 26, 2006

(54) KNOCK DOWN SAWHORSE

(76) Inventor: Jim Frey, 9010 Olive Dr., Spring Valley, CA (US) 91977

(*) Notice: Subject to any disclaimer, the term of this patent is extended or adjusted under 35 U.S.C. 154(b) by 278 days.

(21) Appl. No.: 10/696,948

(22) Filed: Oct. 29, 2003

(65) Prior Publication Data

US 2005/0115768 A1 Jun. 2, 2005

(51) Int. Cl.
*F16M 11/00* (2006.01)

(52) U.S. Cl. .................................... 182/186.5; 182/151

(58) Field of Classification Search ............. 182/186.5, 182/181.1, 151; D25/67; 294/158
See application file for complete search history.

(56) References Cited

U.S. PATENT DOCUMENTS

| | | | | |
|---|---|---|---|---|
| 145,174 | A | 12/1873 | Harden | |
| 1,583,652 | A * | 5/1926 | Brooks | 182/155 |
| 1,612,941 | A * | 1/1927 | Peachee | 182/183.1 |
| 2,911,265 | A | 11/1959 | Hannah | |
| 3,035,660 | A | 5/1962 | Leon | |
| 3,315,574 | A * | 4/1967 | Field et al. | 29/432 |
| 3,603,656 | A | 9/1971 | Ferman | |
| D245,105 | S | 7/1977 | Rader | |
| 4,105,091 | A | 8/1978 | Mahan | |
| 4,182,432 | A | 1/1980 | Cossitt | |
| 4,390,081 | A | 6/1983 | Olmsted | |
| 4,433,753 | A | 2/1984 | Watson | |
| 4,574,917 | A | 3/1986 | Stoddard | |
| D306,349 | S * | 2/1990 | Logan, Jr. | D25/67 |
| 4,923,051 | A * | 5/1990 | Newville | 182/151 |
| D308,728 | S | 6/1990 | Carlson | |
| 4,943,035 | A * | 7/1990 | Thomson et al. | 256/64 |
| D315,025 | S * | 2/1991 | Hall | D25/67 |
| 6,254,158 | B1 * | 7/2001 | Brunelle | 294/158 |

* cited by examiner

*Primary Examiner*—Alvin Chin-Shue
(74) *Attorney, Agent, or Firm*—Walter A. Hackler

(57) ABSTRACT

A knock down sawhorse includes a rail, a pair of legs and a spreader having notches and slots for enabling assembly and disassembly thereof along with holes disposed in each of the rails, legs and spreaders for enabling alignment of the holes with one another upon stacking of the rail, legs and spreaders thereby enabling a handle to maintain the stacked configuration for storage and transport.

7 Claims, 4 Drawing Sheets

KNOCK DOWN SAWHORSE

The present invention is generally directed to a sawhorse and is more particularly directed to a sawhorse which may be readily collapsed and conveniently transported.

Sawhorses are well-known tools for carpenters, hobbyist, homeowners and gardeners.

Sawhorses commonly used by carpenters may be permanently assembled wood sawhorses or utilize metal hardware which receive 2×4 studs for forming a crossbar and legs.

This type of sawhorse is suitable for use, but it is, in fact, so large and cumbersome that transportation is not facilitated.

Permanently assembled sawhorses, of course, are also cumbersome and if it is necessary to utilize more than two sawhorses at a location, storage and transport become of serious concern.

Collapsible sawhorses are known in the art and typically made of plywood and rely on joints and notches to attach legs to a horizontal beam or a rail. When disassembled, most of these sawhorses include three or four flat sections which take up considerably less space for storage and transportation than permanently assembled sawhorses.

However, these individual parts are often cumbersome to handle because of their shape and in larger numbers accountability becomes a problem.

The present invention provides for a collapsible sawhorse which can be disassembled and easily transported as a single unit with the parts held together for storage and transport by a convenient carrying handle.

SUMMARY OF THE INVENTION

A knock down sawhorse in accordance with the present invention generally includes a rail having a pair of spaced apart rail notches disposed in a rail bottom with each rail notch being disposed proximate a corresponding rail end.

A pair of legs is provided with each having a relatively narrow top and a relatively wide bottom. Each leg includes a leg notch disposed in a top and sized for engagement with a corresponding rail notch. Each leg further includes a spreader slot, or hole, disposed beneath each of the leg notches.

A spreader in accordance with the present invention is provided for extending between the legs and includes a pair of spaced apart spreader notches disposed in a spreader bottom with each spreader notch being sized for engagement with a corresponding spreader slot.

Holes are disposed in each of the rail, legs and spreader with each hole being disposed in an associated rail, leg and spreader for enabling alignment of the holes with one another upon stacking of the rail, legs and spreader thereby enabling a cord to pass therethrough for carrying of the stacked rail, legs and spreader. In this fashion, the disassembled sawhorse in accordance with the present invention provides accountability for the disassembled parts and easy transport thereof.

More particularly, the present invention may further include side rails for parallel attachment to the rail in order to form a platform on the knock down sawhorse when assembled.

Preferably, the sawhorse in accordance with the present invention includes a pair of holes disposed in each of the rail, legs, spreader and side rails with each of the pair of holes being spaced apart from one another in an equal distance for enabling alignment of the holes with one another in two columns upon stacking of the rails, legs, spreader and side rails in order to enable a cord to pass through each of the column holes for carrying the stacked rails, legs, spreaders and side rails.

Still more particularly, the present invention may provide for a handle for extending through at least one of the hole columns for carrying the stacked rail, legs, spreader and side rails.

In still in another embodiment of the present invention, the handle may include the cord along with dowels, which are sized for extending through the columns of holes and when are rotated provide a support surface for engaging the stacked disassembled sawhorse, thus facilitating carrying the disassembled sawhorse by the handle.

BRIEF DESCRIPTION OF THE DRAWINGS

The present invention will be more readily understood when taken in conjunction with the accompanying drawings in which.

DETAILED DESCRIPTION

Figure 1:
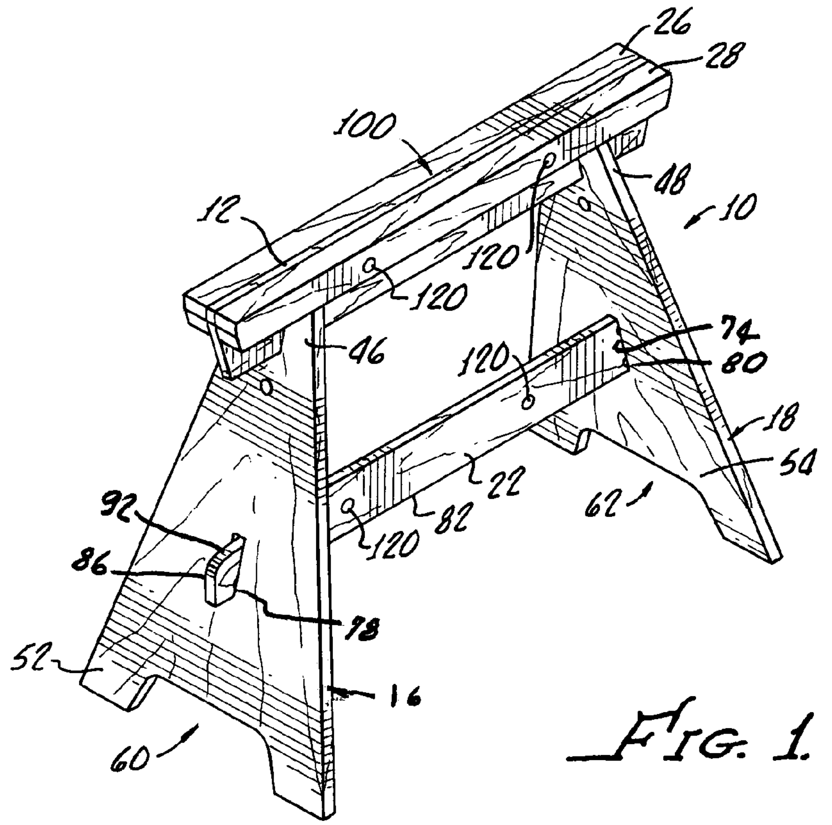
FIG. 1 is a perspective view of an assembled sawhorse in accordance with the present invention generally showing a rail, legs, spreader and side rails.

With reference to FIGS. 1–4, there is shown a sawhorse 10 in accordance with the present invention generally including a rail 12, a pair of legs 16, 18 and a spreader 22 along with side rails 26, 28. It should be appreciated that the rail 12, legs 16, 18 and spreader 22 may be formed from any suitable plywood while the side rails are preferably formed from any suitable stock.

Figure 3:
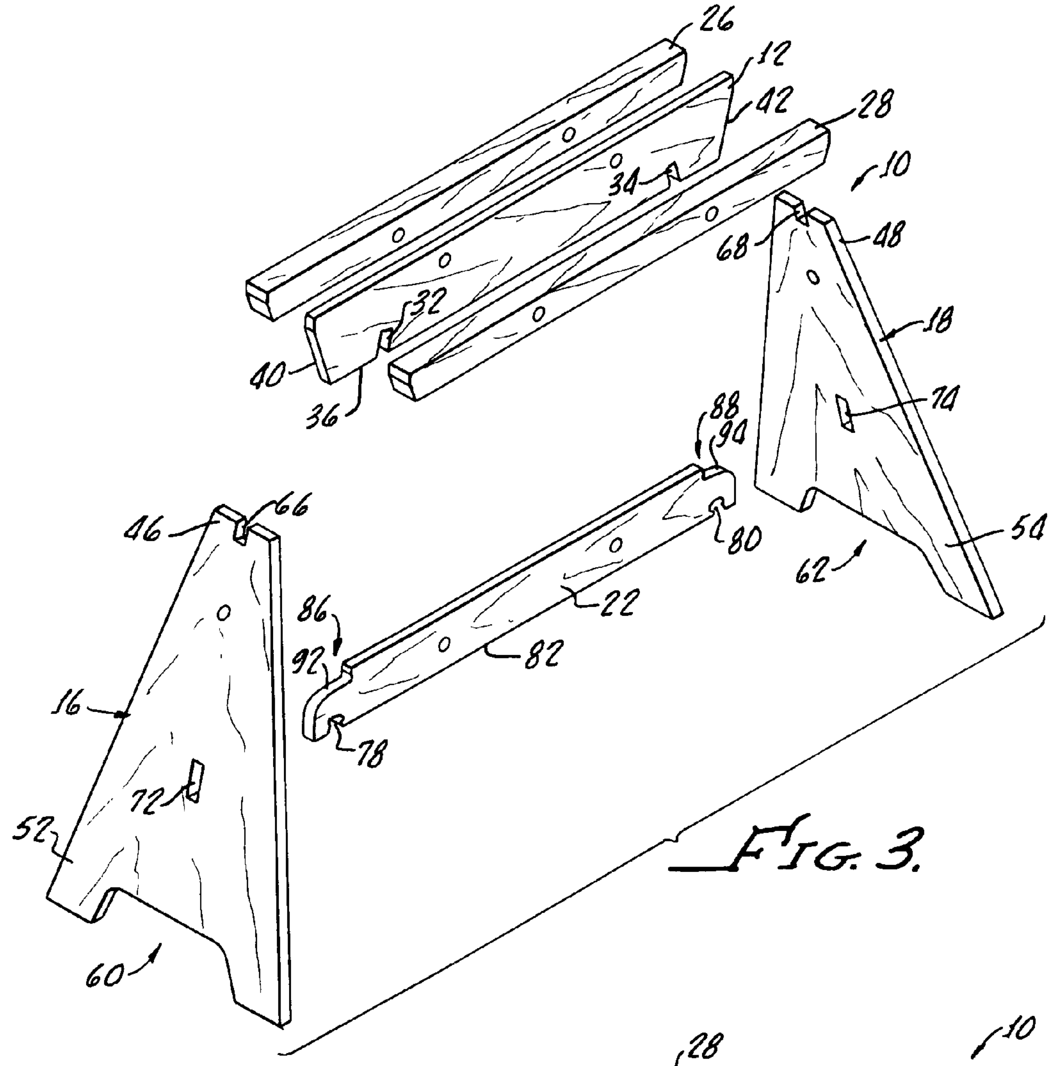
FIG. 3 is a perspective exploded view of the sawhorse in accordance with the present invention.
Figure 4:
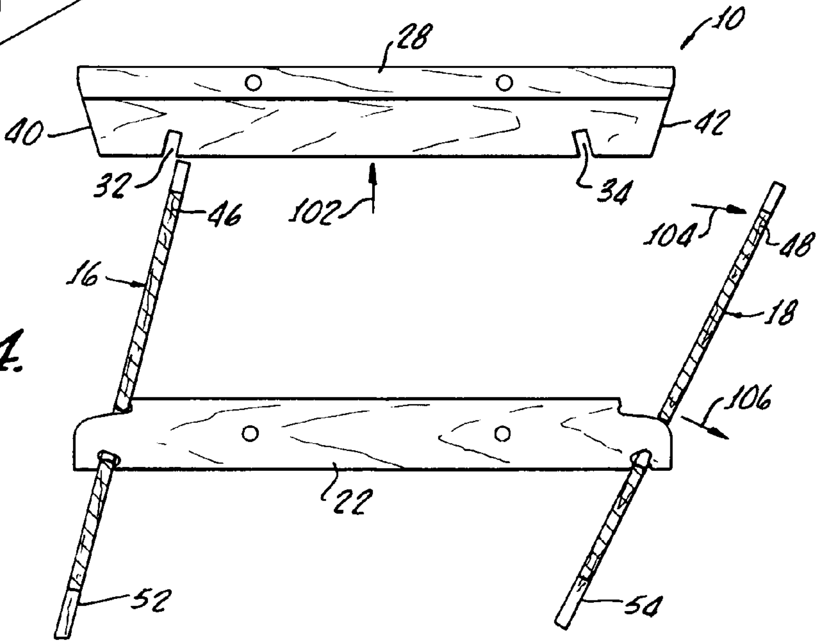
FIG. 4 is a side view illustrating disassembly of the sawhorse.

With reference to FIGS. 3 and 4, the rail 12 more particularly includes a pair of spaced apart rail notches 32, 34 disposed in a rail bottom 36 with each rail notch 32, 34 being disposed proximate a corresponding rail end 40, 42.

Each of the legs 16, 18 include a relatively narrow top 46, 48 and a relatively wide bottom 52, 54 and cutouts 60, 62 may be provided at the bottoms 52, 54 in order to increase stability of the sawhorse on uneven ground (not shown).

Each of the legs 16, 18 include a leg notch 66, 68 disposed in tops 46, 48 of the legs 16, 18 and sized for engagement with the rail notches 32, 34.

In addition, each of the legs 16, 18 include spreader slots, or holes, 72, 74 respectively which are disposed beneath the leg notches 66, 68.

The spreader 22 includes a pair of spreader notches 78, 80 disposed in a spreader bottom 82 proximate spreader ends 86, 88. The spreader notches 78, 80 as well as rounded portions 92, 94 on the ends 86, 88 are sized for engagement with corresponding spreader slots 72, 74 in the legs 16, 18.

Figure 2:
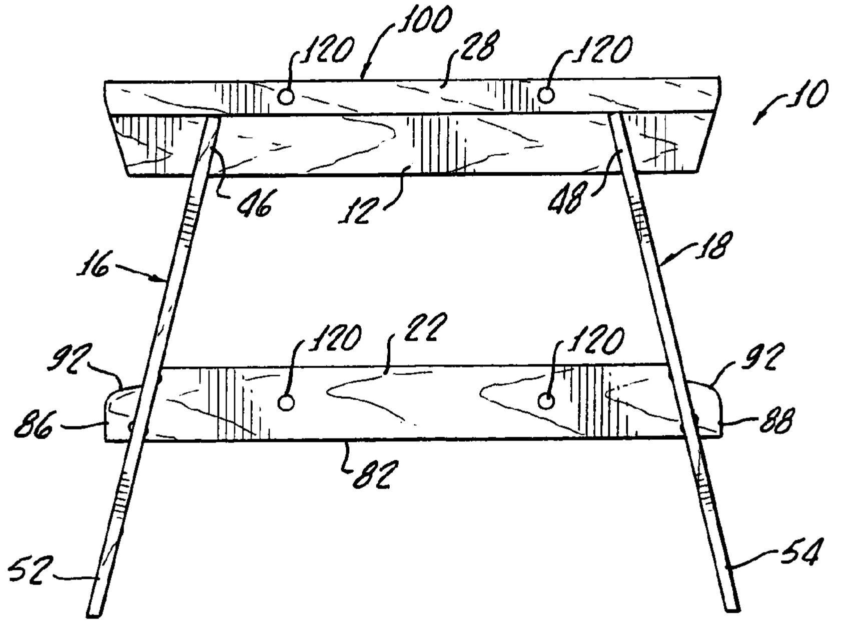
FIG. 2 is a side view of the assembled sawhorse as shown in FIG. 1.

The side rails 26, 28 may be attached to the rail, if desired, in order to provide a platform 100, see FIGS. 1 and 2, through the use of bolts and thumbscrews (not shown).

Without the side rails 26, 28, the sawhorse provides for a minimum of contact with supported surfaces (not shown), which is convenient for painting projects.

However, when a broader support surface is desired, the side rails 26, 28 are attached to the rail 26 to provide a more stable platform 100 suitable for projects such as sawing or nailing of lumber pieces (not shown).

Disassembly of the sawhorse 10 is illustrated in FIG. 4, in which the rail 12 and side rails 26, 28 are lifted upward in the direction of arrow 102 thereby enabling rotation of the legs 16, 18 (only shown for leg 18) by arrows 104, 106 in order to extract the spreader ends 86, 88 from the spreader notches 78, 80.

Figure 5:
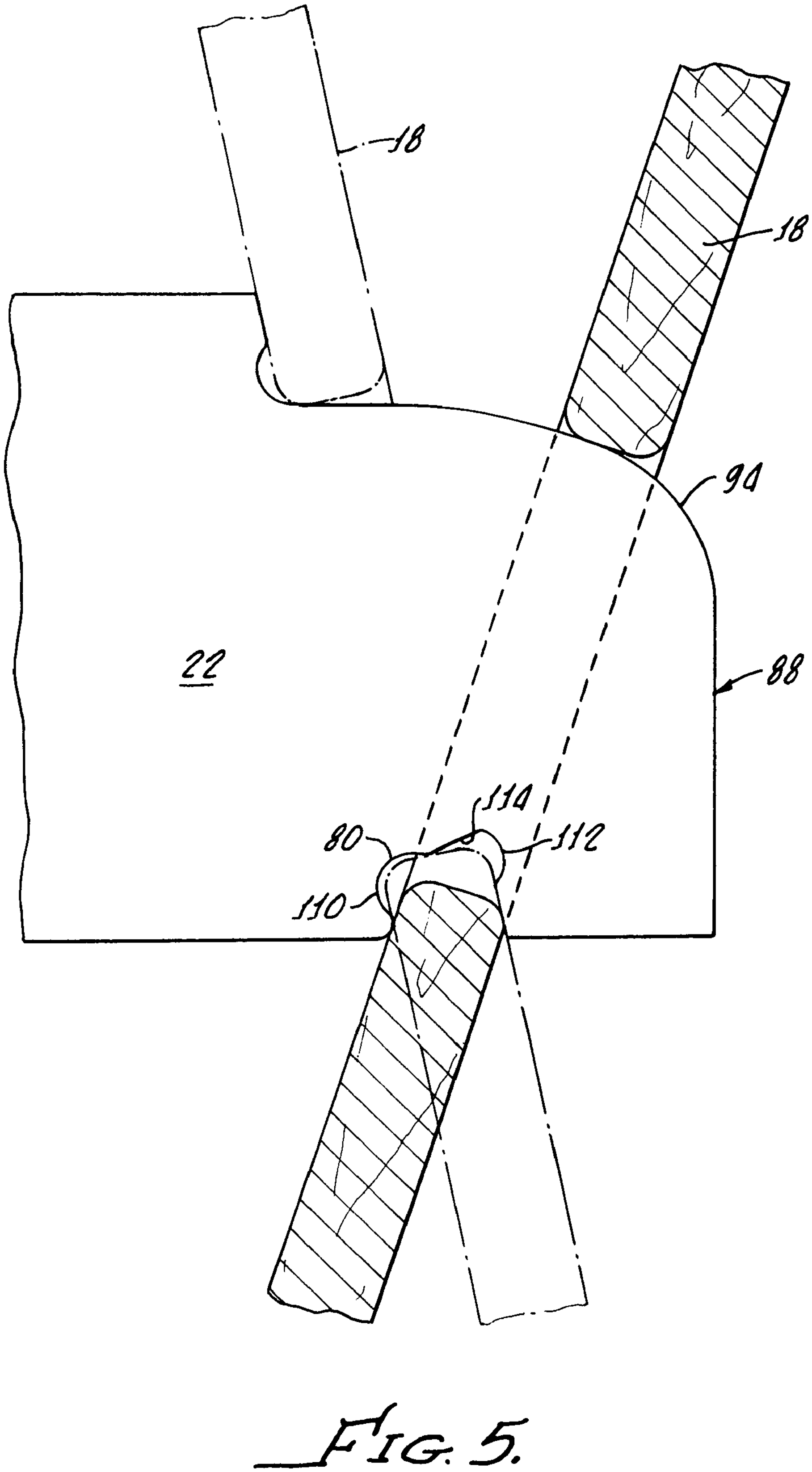
FIG. 5 is an enlarged view of a spreader and leg showing engagement therewith with notches, including lobed bottoms for facilitating such assembly and, additionally facilitating manufacture thereof.
Figure 6:
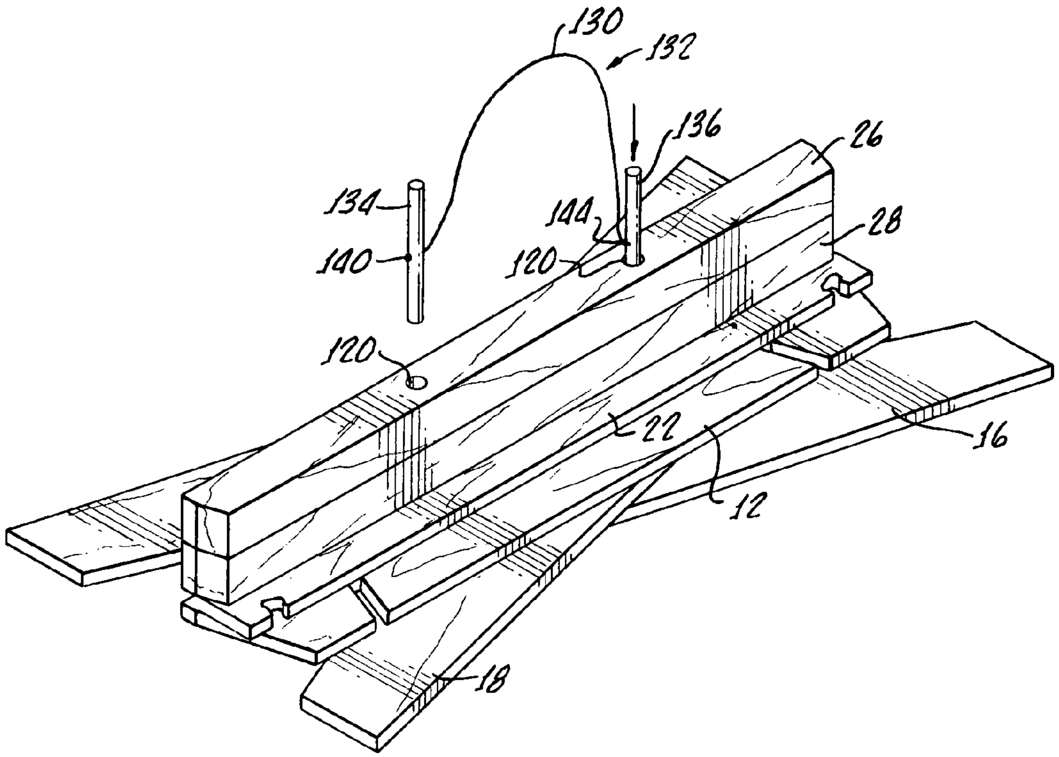
FIG. 6 is a perspective view of a disassembled sawhorse in accordance with the present invention shown with a handle for grouping all of the parts of the sawhorse in a single transportable unit through the alignment of holes provided through each of the rail, legs, cross member and side rails.

As more particularly shown in FIG. 5, a spreader notch 80 includes lobed portions 110, 112 which provide a lobed bottom 114 for facilitating assembly knocked down and fabrication of the sawhorse 10. It should be appreciated that each of the notches hereinabove recited include such a lobed configuration, which may not be appreciated from other Figures due to the size thereof with respect to the overall dimension of the Figures presented.

Figure 7:
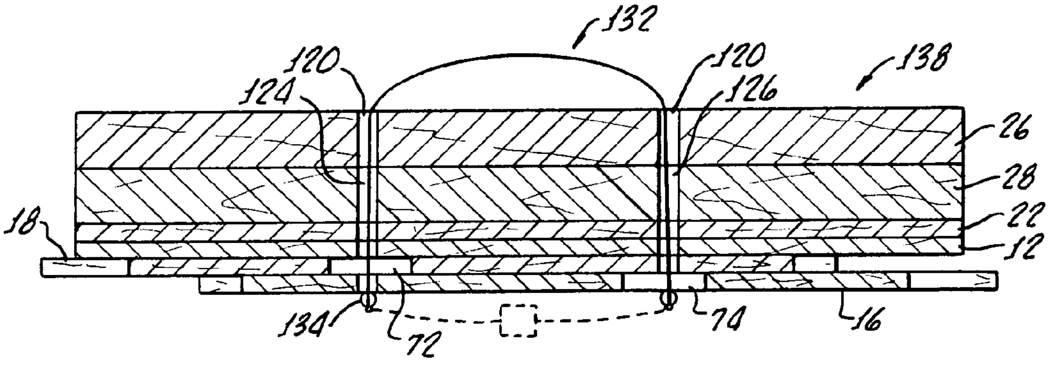
FIG. 7 is a cross sectional view of a disassembled sawhorse in accordance with the present invention illustrating the holes through each of the rail, legs, spreader and side rails forming a column through which the handle, which includes a cord and dowels, may be inserted in order to maintain the disassembled sawhorse in a stacked relationship and provide accountability of the parts during storage and transport.

As shown in all of the FIGS. 1–7, holes 120 through the rail 12, legs 16, 18, spreader 22 and side rails 26, 28 and indicated by a common reference number 120 are provided and disposed in an associated rail, leg, spreader or side rail for enabling alignment of the holes 120 with one another and slots 72, 74, as shown in FIG. 7, to form a column 124, 126 which provides a passageway for a cord 130 which forms part of a handle 132 along with dowels 134, 136 which are sized for a passage through the holes 120.

After disassembly of the sawhorse 10 and stacking of the rail 12, legs 16, 18, spreader 22 and side rails 26, 28 to align the holes to form the columns 124, 126, the dowels 134, 136 may be passed therethrough and reoriented beneath the stacked sawhorse 138 in order to maintain the stacked sawhorse 138 to prevent loss of individual parts including the rail 12, legs 16, 18, spreader 22 and side rails 26, 28.

It should be appreciated that the cord 130 may be utilized without the dowels 134, 136 and that only one of the dowels 134, 136 may be utilized in combination with the cord if either end 140, 142 of the cord 130 is attached at some position with one of the rail 12, legs 16, 18, spreader 22 or side rails 26, 28.

It should also be appreciated that the order of stacking may be varied from that shown in FIG. 7.

This important feature of the present invention insures accountability for all of the sawhorse 10 members during disassembly and storage. Namely, the rail 12, legs 16, 18, spreader 22 and side rails 26, 28 are gathered and maintained in a stacked relationship by the handle cord 130, as shown, for easy storage and transportation.

It should also be appreciated that the cord itself may extend through the hole columns 124, 126 and be joined by a connector 144 arrangement as shown in dashed line in FIG. 7.

Although there has been hereinabove described a specific knock down sawhorse in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclosed herein. Accordingly, any and all modifications, variations or equivalent arrangements which may occur to those skilled in the art, should be considered to be within the scope of the present invention as defined in the appended claims.

What is claimed is:

1. A knock down sawhorse comprising:

a rail having a pair of spaced apart rail notches disposed in a rail bottom, each rail notch being disposed proximate a corresponding rail end;

at least one side rail for parallel attachment to said rail for forming a platform on said knock down sawhorse;

a pair of legs each having a relatively narrow top and a relatively wide bottom, each leg having a leg notch disposed in the top thereof and sized for engagement with a corresponding rail notch and a spreader slot disposed beneath each leg notch;

a spreader having a pair of spaced apart spreader notches disposed in a spreader bottom, each spreader notch being sized for engagement with a corresponding spreader slot, the notches including lobed bottoms for facilitating assembly of said knock down sawhorse;

a pair of holes disposed in each of the rail, side rail and spreader, each pair of holes being spaced apart from one another an equal distance for enabling alignment of the holes with one another and corresponding spreader slots in two columns upon stacking of the rail, side rail, legs and spreader; and a handle for extending through at least one of the hole columns for carrying the stacked rail, side rail, legs and spreader.

2. The sawhorse according to claim 1 further comprising two side rails for parallel attachment to said rail for forming a platform on said knock down sawhorse.

3. The sawhorse according to clam 1 wherein said handle comprises a cord and at least one dowel attached to one end of said cord, said dowel being sized for enabling passage through at least one of the hole columns.

4. The sawhorse according to claim 1 wherein said handle comprises a cord and two dowels attached to ends of said cord, said dowels being sized for enabling passage through each of the hole column.

5. A knock down sawhorse comprising:

a rail having a pair of spaced apart rail notches disposed in a rail bottom, each rail notch being disposed proximate a corresponding rail end;

two side rails for parallel attachment to said rail for forming a platform on said knock down sawhorse;

a pair of legs each having a relatively narrow top and a relatively wide bottom, each leg having a leg notch disposed in the top thereof and sized for engagement with a corresponding rail notch and a spreader slot disposed beneath each leg notch;

a spreader having a pair of spaced apart spreader notches disposed in a spreader bottom, each spreader notch being sized for engagement with a corresponding spreader slot, the notches having lobed bottoms for facilitating assembly of said knock down sawhorse;

a pair of holes disposed in each of the rail, side rails, spreader and side rails, each pair of holes being spaced apart from one another and corresponding spreader slots for enabling alignment of the holes with one another in two columns upon stacking of the rail, side rails, legs, spreader and side rail; and a handle for extending through at least one of the hole columns for carrying the stacked rail, legs, spreader and side rail.

6. The sawhorse according to clam 5 wherein said handle comprises a cord and at least one dowel attached to one end of said cord, said dowel being sized for enabling passage through at least one of the hole column.

7. The sawhorse according to claim 5 wherein said handle comprises a cord and two dowels attached to ends of said cord, said dowels being sized for enabling passage through each of the hole columns.

* * * * *